March 20, 1928.

T. M. EYNON 1,663,532

OPERATING MEANS FOR LIQUID HEIGHT INDICATORS

Filed March 19, 1921  3 Sheets-Sheet 1

Witness:
Walter Chism

Inventor:
Thomas M. Eynon,
by
Attorney.

March 20, 1928.  1,663,532

T. M. EYNON

OPERATING MEANS FOR LIQUID HEIGHT INDICATORS

Filed March 19, 1921  3 Sheets-Sheet 2

Witness:
Walter Chism

Inventor:
Thomas M. Eynon
by
Attorney.

March 20, 1928.  
T. M. EYNON  
1,663,532  
OPERATING MEANS FOR LIQUID HEIGHT INDICATORS  
Filed March 19, 1921  
3 Sheets-Sheet 3
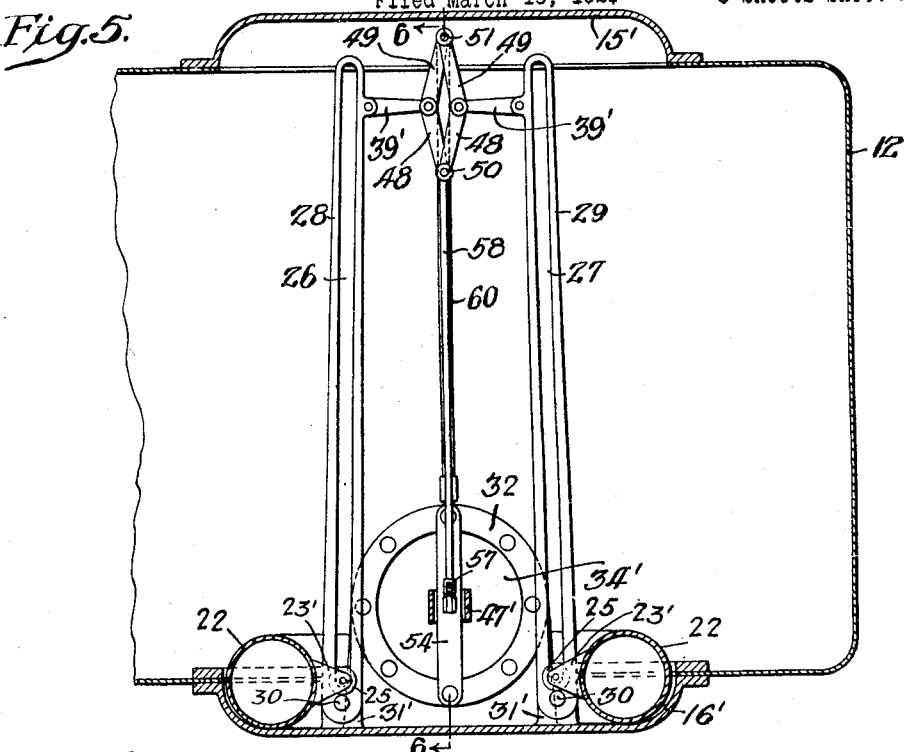
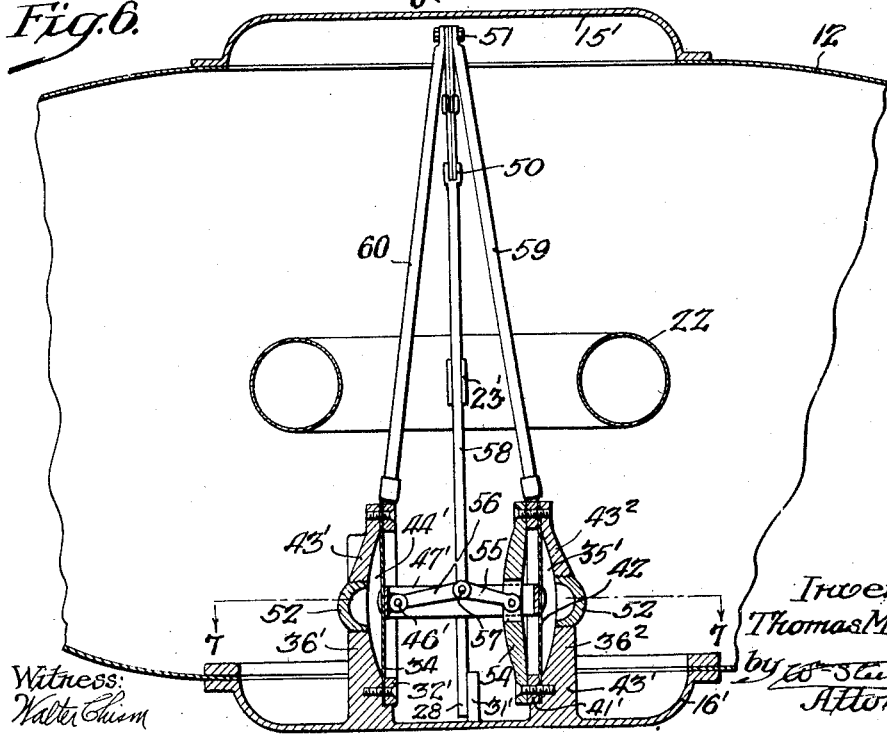

Patented Mar. 20, 1928.

1,663,532

UNITED STATES PATENT OFFICE.

THOMAS M. EYNON, OF PHILADELPHIA, PENNSYLVANIA.

OPERATING MEANS FOR LIQUID-HEIGHT INDICATORS.

Application filed March 19, 1921. Serial No. 453,839.

My invention relates to operating means for indicators showing the height of gasoline in a tank and giving indication thereof upon the dashboard of an automobile or at any other convenient point at a distance from the tank.

The purpose of my invention is to use a float having a relatively small vertical extension and to connect it with fluid or fluid pressure indicating mechanism through cam lever actuation by the float.

A further purpose is to translate vertical movement of the float into lateral movement of a cam which is connected to an operating diaphragm by arms and a connecting rod and intermediate connections.

A further purpose is to cause the liquid for the indicator to flow by means of a diaphragm or diaphragms and to guide the float by the diaphragm-actuating mechanism.

A further purpose is to use a vertically-movable ring-like float; and to guide it interiorly.

A further purpose is to vary the indication through a ring-like float and arms wedge-operated by movement of the float.

Further purposes will appear in the specification and in the claims.

I have preferred to illustrate my invention by slight variations only representing several only among the various forms by which it might be carried out, selecting a form which is practical, efficient and reliable and which at the same time well illustrates the principles of my invention.

Figure 1:
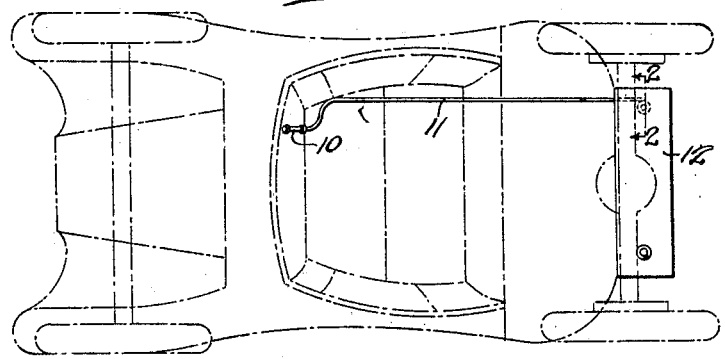

In this preferred form Figure 1 is an outline plan view of an automobile, showing my invention applied thereto.

Figure 2:
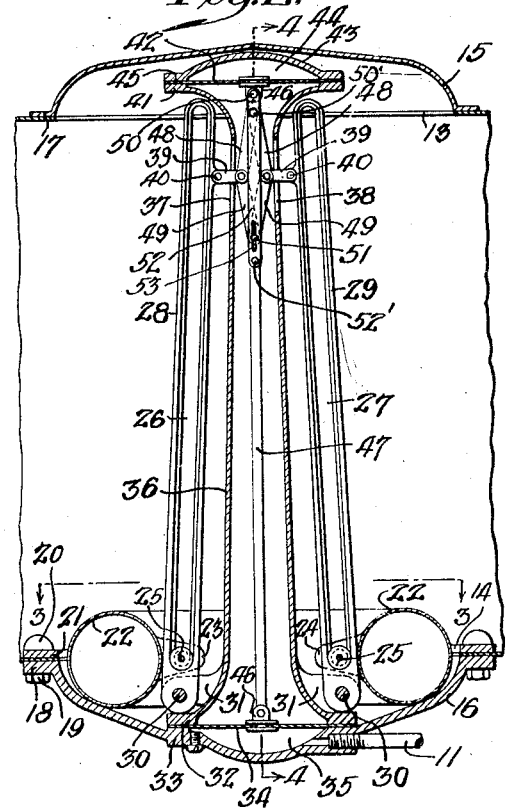

Figure 2 is a broken vertical section upon an enlarged scale taken upon line 2—2 of Figure 1.

Figure 3:
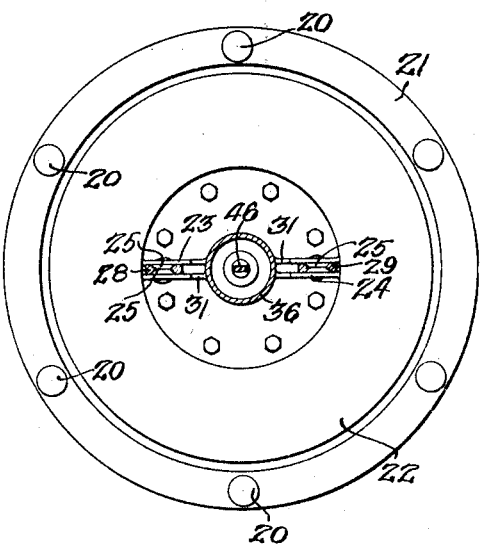
Figure 4:
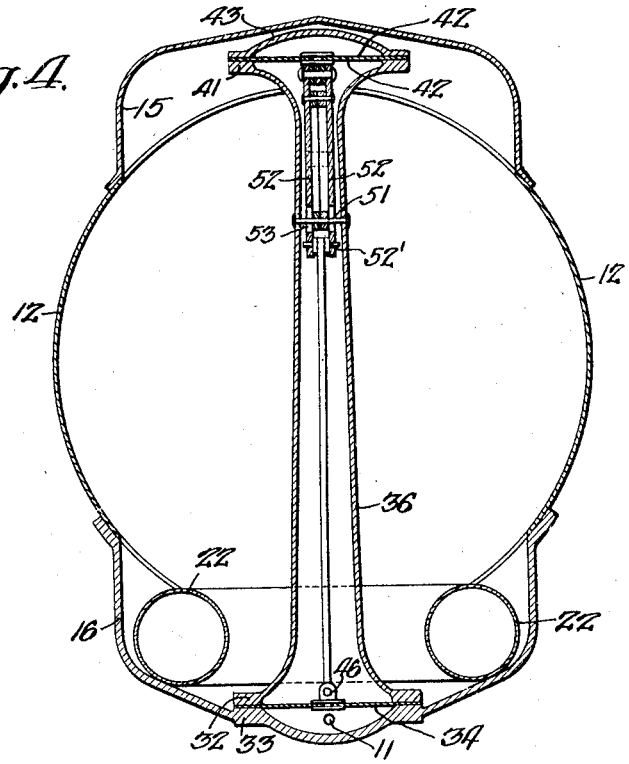

Figures 3 and 4 are sections upon lines 3—3 and 4—4 of Figure 2.

Figures 5 and 6 are sections corresponding generally to Figures 2 and 4 respectively but showing a slightly modified form and with the float in different positions in the two figures.

Figure 7:
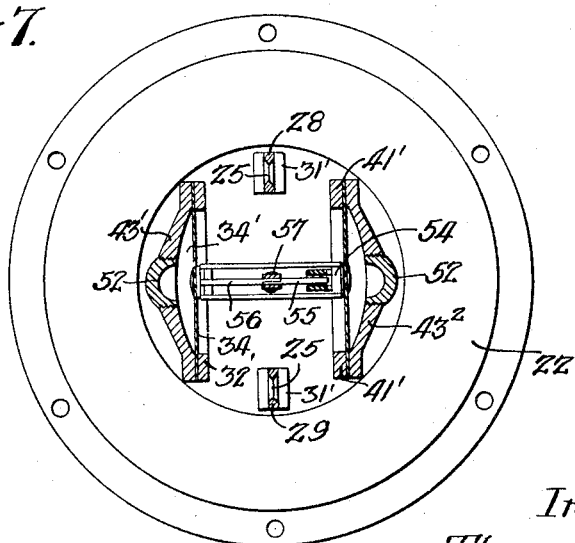

Figure 7 is a section upon line 7—7 of Figure 6.

Similar numerals indicate like parts in the drawing.

In the indication of gasoline height in the tank at or near the dash-board, I may use any suitable type of sight or pressure fluid indicator intended to be shown typically by the sight tube 10, which is connected by a pipe 11 with a space beneath or back of a diaphragm within or connected with tank 12. Whether one diaphragm or two be used and the exact relation of the diaphragm to the operating mechanism, whether toggle operated or operated by lazy-tongs or by other equivalent mechanical arms and connections is not material to the broader aspects of this invention.

Because I desire to have the float register extreme conditions of fluid height, both low and high, and because I desire to mount the operating mechanism upon an inserted top or bottom section which takes the place of a portion of the top or bottom of the tank wall I cut openings in the tank as at 13 and 14 and apply to these openings closures 15 and 16, (in Figure 6, 15', 16') which may afford a raised cover and a recessed bottom, respectively, within which cover and bottom room is provided for the float to enter at the extremes of its travel. The cover and bottom are fastened to the tank by any suitable flanges 17, 18, either permanently, as shown for the cover, or temporarily, as shown with the bottom, where bolts 19 pass through the flange and screw into—but preferably not through—lugs 20 upon rings 21. Though obviously this is not material I have preferred to locate the operating mechanism at the top.

In order that the float may require as little extension beyond the tank as possible, and also that it may cooperate to the best advantage with the rest of the structure, I use a float having relatively small vertical extension here shown at 22 as of ring-like form. The float is provided with any number of inwardly extending ears 23 and 24 having engaging members shown as rollers 25, which ride in slots 26 and 27 of a corresponding number of laterally swinging arms 28 and 29. Two are sufficient.

The arms are pivoted at 30 in ears 31 rigidly connected with a ring 32. This ring 32 forms the upper retaining member cooperating with a lower annular seat member 33 to hold the diaphragm 34, and the metal below the diaphragm is spaced from it to provide a space 35 for fluid, which space is in communication with pipe 11; with the purpose and effect that the movement of or pressure upon the diaphragm directly affects the height or pressure of the fluid in the indicator 10.

The ring 32 carries a support 36, here in the form of a column or tube connecting with one edge of the ring and not intended to retain the gasoline. It is slotted at 37 and 38 to allow passage of links 39 which are pivoted at 40 to the upper ends of the arms 28 and 29.

At its upper end the standard or support carries a ring 41 which forms the seat and support for a second diaphragm 42. This diaphragm is covered by a cap 43 which allows a space 44 between it and the diaphragm and which carries a ring 45 cooperating with ring 41 to retain the diaphragm. The space 44 may be closed or connected with the atmosphere, or, by reversal of connections or type of indicator, may be utilized instead of the space 35 for connection with the indicating mechanism.

The two diaphragms carry lugs 46, which are connected by a rod 47 and its attached plates 52 causing the diaphragms to move together.

The links 39 are connected at their inner ends to the links or bars 48, 49 duplicated on opposite sides to form a lazy tongs construction having but a single span. The arms 48 are pivotally connected and supported at their upper ends. It is more convenient not to support them in the lugs 46 as at 50 but to support them below this point at 50' between the plates 52 which are themselves pivoted to the lugs at 50 and which at their lower ends are connected at 52' on opposite sides of a lower rod member to make of the plates and lower rod member the composite rod 47. At their lower ends the arms 49 are pivoted to a pin 51 which passes through slots in the plates 52. This permits lifting and lowering of the rod within its range of movement without interference with the pin 51 and arms 48, 49.

In operation the float rises and falls with the raising and lowering of the liquid level in the tank, meantime spreading apart or drawing together the arms 28 and 29. The spreading apart of the arms lowers the rod 47 and lowers the diaphragms 34 and 42. As one of these encroaches upon the cubical contents available for gas in the tank to the same extent that the other increases the cubical contents available, there will be no alteration in the capacity of the tank and my invention will be free from error because of such variation. A single diaphragm could be used where it is not desired to take advantage of this refinement.

The lowering of the diaphragm 34 increases the height or pressure of the liquid within the indicator giving a corresponding showing upon the gauge, whose readings may be calibrated, if desired or which may be used merely to give a visual approximate showing of the condition of the gasoline in the tank.

In the form shown in Figures 5, 6 and 7, two diaphragms 34 and 42 are also used, united by connection 47'. In this case, however, the diaphragms are differently supported, being held by separate standards 36', 36², which form heads 43', 43², within which are formed spaces 44', 35', one of which is connected with the fluid gauge. For convenience and adjustability, I provide plugs 52 in the sides. Removal of these plugs permits change of liquid in the system. Adjustment of these plugs can be used to adjust the setting of the gauge and the plugs can be so finished as to require a special implement for this adjustment. As this mechanism is located in the interior of the tank, the adjustment would be a rough adjustment only. Very slight changes as compared with corresponding parts in Figs. 1–4 are shown in the arms 23', 24', ears 31', ring 32' and links 39'.

Here as in the other form, the lazy tongs is effective as a pair of oppositely-moving toggles.

The standards 36', 36² are mounted within the bottom of 16' and the diaphragms are held in position by rings 32' and 41'. The bracket 54 supports the pivot point of one arm 55 to which a second arm 56 is pivoted at 57 to form a toggle. The pivot connects also with the operating rod 58. The other end of arm 56 is pivoted at 56' to the ear upon the diaphragm.

The upper lazy-tongs pivot 51 is supported by side rods 59 and 60 which are connected with the rings 41' and 32' respectively, by means of sockets upon the rings into which sockets the rods fit.

The same float is shown with the same slotted arms and link connection to a lazy-tongs as in the other form except that lifting of the float here lifts the rod 58, and lowering of the float results in lowering the rod, but with the same effect of increasing or reducing the indication. Upward movement of the float and rod lifts the toggle pin with movement of both diaphragms to the right. With this connection it is therefore desirable to use the fluid in the space 35' rather than fluid in the space 44' to operate the gauge.

With movement of the diaphragm 42 to the right the height or pressure of fluid in the gauge would increase, corresponding to the increase of the height of the float.

I appreciate that my disclosure herein will suggest various forms of my invention to those skilled in the art, the forms differing according to the purpose in mind by the designer as well as his preference, preliminary training, or even his whim, and it is my intention to include herein all such variations as come within the spirit and scope of my invention.

Having thus described my invention, what I claim as new and desire to secure by Letters Patent is:—

1. In an indicating device for gasoline tanks, a tank, a fluid operated indicator, a diaphragm within the tank, a casing at one side of the diaphragm closing a space adjacent thereto, thus shut off from the remainder of the tank, means for connecting the space with the indicator, a float, slotted arms with which the float engages and connections between the arms and diaphragm including a toggle whereby lifting of the float causes movement of the diaphragm to contract the space and lowering of the float causes movement of the diaphragm to expand the space.

2. In an indicating device for gasoline tanks, a tank, a fluid operated indicator, a diaphragm within the tank, a casing at one side of the diaphragm closing a space adjacent thereto shut off from the remainder of the tank, means for connecting the space with the indicator, a second diaphragm, a cover enclosing a space adjacent the second diaphragm, connections between the diaphragms whereby they are balanced with respect to pressure and vacuum conditions within the tank, a float and connections between the float and one diaphragm whereby lifting of the float causes movement of the diaphragm to contract one of the spaces and lowering of the float causes movement of the diaphragm to expand said space.

3. In an indicating device for gasoline tanks, a tank, a pair of balanced diaphragms and casings enclosing spaces adjacent the diaphragms to cut them off from communication with the remainder of the tank, float-operated connections for moving the diaphragms to contract one of the spaces with upward movement of the float, a fluid operated indicator and fluid connections between the indicator and the space so contracted.

4. In an indicating device for gasoline tanks, an apertured tank, a closure for the aperture, a diaphragm cooperating with the closure to provide a space on one side of the diaphragm free from the communication with the remainder of the tank, a fluid-operated indicator, means for connecting the indicator with said space, a vertical movable float, movable arms operated thereby and a connection including a toggle between the arms and the diaphragm.

5. In an indicating device for gasoline tanks, a tank, a support mounted in the tank, two diaphragms mounted in opposed relation on the support, walls enclosing each diaphragm at one side to form a space free from communication with the remainder of the tank, a fluid operated indicator, means for connecting the indicator with one of the spaces, a connection between the diaphragms, a float surrounding the support and a lever connection between the float and one of the diaphragms whereby vertical movement of the float causes contraction of the space with which the indicator communicates.

6. In an indicating device for gasoline tanks, a tank, a ring float therein, a diaphragm mounted below and surrounded by the ring float, walls enclosing the diaphragm on one side to form a space free from communication with the remainder of the tank, a fluid-operated indicator, means for connecting the indicator with the said space and connections between the float and diaphragm and transforming vertical movement of the float into movement of the diaphragm.

7. In an indicating device for gasoline tanks, a tank, a ring float within the tank, a pair of diaphragms coaxial with the ring, walls enclosing each diaphragm on one side to form fluid spaces free from communication with the remainder of the tank, a fluid indicator and connections therefrom and communicating with one of the spaces, and connections between the float and diaphragms including a toggle for contracting said last named space and expanding the other space with upward movement of the float.

8. In an indicating device for gasoline tanks, a tank, a ring float within the tank, a pair of diaphragms coaxial with the ring, walls enclosing each diaphragm on one side to form fluid spaces free from communication with the remainder of the tank, a fluid indicator and connections therefrom and communicating with one of the spaces, a connection between the diaphragms to cause them to move in unison, and connections between the float and diaphragms including a toggle for contracting the space connected with the indicator with upward movement of the float.

9. In an indicating device for gasoline tanks, a tank, a vertically movable float therein, a plurality of swinging arms each pivoted at one end and engaged by the float to swing toward or away from the float centre with vertical movement of the float, a diaphragm, a fluid indicator, and means controlled by the vertical movement of the float and swinging movement of the said arms to operate the diaphragm with the movement of the float and arms and indicator-actuating means controlled by the movement of the diaphragm.

10. In an indicating device for gasoline tanks, a tank, a float therein, a pair of arms pivoted at one end each and connected to the float to be moved thereby toward and from each other with vertical movement of the float, a fluid indicator, a diaphragm, means cooperating by said diaphragm to enclose a space, means for connecting said space with the said indicator and connections, including a toggle between the arms and the diaphragm to move the diaphragm with swinging movement of the arms.

11. In an indicating device for gasoline tanks, a tank, a ring like float therein, a pair of arms pivoted at their lower ends and extending upwardly inside of the float, connections between said float and arms, whereby vertical movement of the float causes the arms to swing toward or away from each other, a four-link toggle connection between the arms having one pivot fixed, a diaphragm, means cooperating therewith to enclose a space and connection between the diaphragm and the pivot of the toggle opposite its fixed pivot whereby the lifting and lowering of the float operates the diaphragm.

12. In an indicating device for gasoline tanks, a tank, a ring-like float therein, a pair of arms pivoted at their lower ends and extending upwardly inside of the float, connections between said float and arms, whereby vertical movement of the float causes the arms to swing toward or away from each other, a four-link toggle between the arms having fixed support at one pivot point, a pair of connected diaphragms, connected with the pivot of the toggle opposite said fixed pivot point and walls adjacent the diaphragms and providing therewith enclosed spaces on one side of each diaphragm.

13. In an indicating device for gasoline tanks, a tank, a ring-like float therein, a pair of arms each pivoted at one end and extending inside of the float, connections between said float and arms, whereby vertical movement of the float causes the arms to swing toward or away from each other, a four-link toggle between the arms having fixed support at one pivot point, upper and lower diaphragms, means cooperating therewith to provide enclosed spaces adjacent the diaphragms, connections between the diaphragms to cause them to move in unison and means for causing the connections to move with movement of the pivot point of the toggle opposite the fixed support.

14. In an indicating device for gasoline tanks, a tank, a ring-like float therein, a pair of arms each pivoted at one end and extending inside of the float, connections between said float and arms whereby vertical movement of the float causes the arms to swing toward or away from each other, a pair of opposed diaphragms, means with each diaphragm to enclose therewith a space, connections between the diaphragms and arms to operate the diaphragms with movement of the float.

15. In an indicating device for gasoline tanks, a tank, a ring-like float therein, a pair of arms pivoted at their lower ends and extending upwardly inside of the float, connections between said float and arms whereby vertical movement of the float causes the arms to swing toward or away from each other, a four-link toggle between the arms having a fixed support at one pivot point, a pair of diaphragms on opposite sides of the toggle and a connection between the diaphragms connected to the pivot point of the toggle opposite that one which is fixed.

16. In an indicating device for gasoline tanks, a tank, a ring-like float therein, a pair of slotted arms surrounded by the float and pivoted at their lower ends, means upon the float engaging with the slots of the arms to swing the arms toward or from each other with vertical movement of the float, links connected with the upper ends of the arms, a four-link toggle having one pivot fixed in position and the two adjacent pivots connected with the links, a diaphragm, means providing an enclosed fluid space adjacent the diaphragm and connections between the diaphragm and the fourth pivot of the toggle.

17. In an indicating device for gasoline tanks, a tank, a pair of opposed diaphragm supports therein, providing each a space adapted to be closed by a diaphragm, diaphragms for closing the said spaces, a connection between the diaphragms, a bracket providing a fixed support, a four-link toggle mounted upon a support and having connections from two of its pivots to operate the diaphragms and a float and connections affording operating means for operating the toggle.

18. In a fluid indicator for showing the height of gasoline in an automobile tank, a tank, a float, a pair of arms pivoted upon fixed pivots, operating means movable generally in the direction of the lengths of the arms cooperating with the float to swing the arms with vertical movement of the float, a diaphragm, a longitudinally movable rod connected to operate the diaphragm, and a four link toggle system fixed at one pivot, connected to the arms at pivots adjacent the fixed pivot and having the other pivot connected with the rod to move the rod with lateral movement of the arm-connected pivots.

THOMAS M. EYNON.